United States Patent [19]
Lohr

[11] Patent Number: 5,437,356
[45] Date of Patent: Aug. 1, 1995

[54] CENTRIFUGAL CLUTCH

[75] Inventor: Thomas H. Lohr, Richmond, Ind.

[73] Assignee: Hoffco, Inc., Richmond, Ind.

[21] Appl. No.: 138,414

[22] Filed: Oct. 18, 1993

[51] Int. Cl.⁶ ............................................. F16D 43/14
[52] U.S. Cl. ........................... 192/105 BA; 192/103 B; 192/75
[58] Field of Search ........ 192/105 A, 105 BA, 103 B, 192/74, 75

[56]  References Cited

U.S. PATENT DOCUMENTS

| | | | |
|---|---|---|---|
| 1,956,417 | 4/1934 | Else | 192/105 BA |
| 2,947,399 | 8/1960 | Moore et al. | 192/105 BA |
| 3,477,555 | 11/1969 | Hazzard | 192/105 BA X |
| 3,581,857 | 6/1971 | Dallman | 192/105 BA X |
| 3,696,901 | 10/1972 | Henry | 192/105 BA |
| 3,768,611 | 10/1973 | Frederickson | 192/105 BA |
| 3,971,463 | 7/1976 | Zindler | 192/105 BA |
| 4,205,509 | 6/1980 | Miyazawa et al. | |
| 4,212,379 | 7/1980 | Zoino | |
| 4,418,808 | 12/1983 | Nagai | |
| 4,681,199 | 7/1987 | Maucher et al. | 192/105 B X |

FOREIGN PATENT DOCUMENTS 2852571  6/1979  Germany ..................... 192/105 BA

*Primary Examiner*—Andrea L. Pitts
*Attorney, Agent, or Firm*—Barnes & Thornburg

[57]  ABSTRACT

A centrifugal clutch includes a pair of clutch shoes, a rotor, and a housing around the clutch shoe and rotor. Each clutch shoe is formed to include pockets that receive drive arms on the rotors. The shape of the pocket on the top side of the clutch shoe is different than the shape of the pocket on the bottom side so that the clutch has one torque capacity if the rotor drive arm extends into the "top side" pocket and a different torque capacity if the rotor drive arm extends into the "bottom side" pocket. The side walls of each pocket and the side walls on each rotor drive arm are shaped and configured so that a user can change the torque capacity of the clutch by changing the orientation of the clutch shoes relative to the rotor drive arms inside the housing.

34 Claims, 7 Drawing Sheets

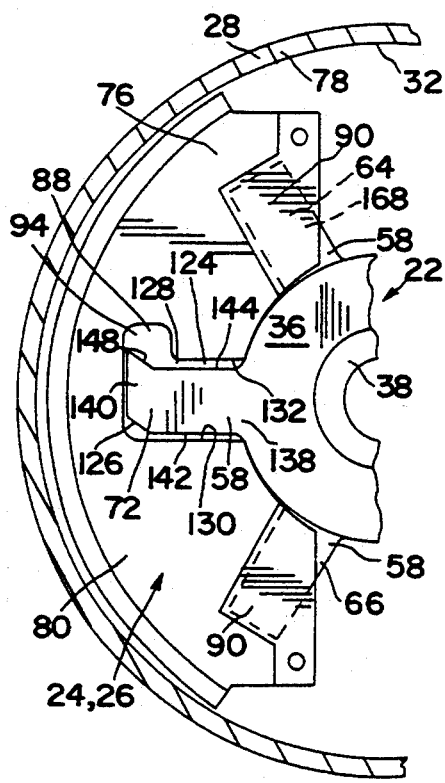
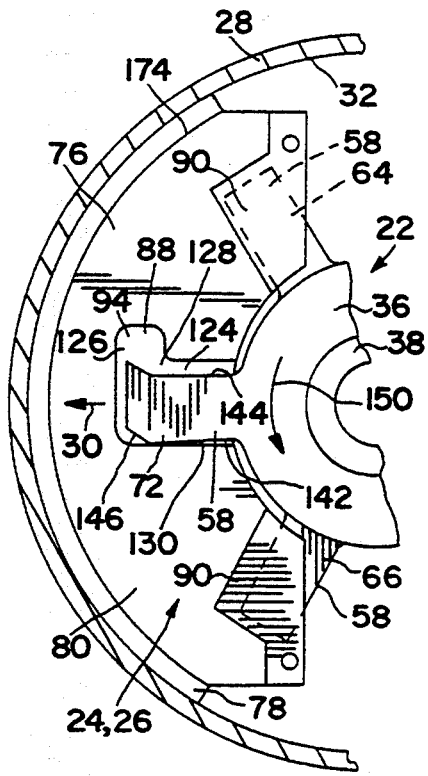
FIG. 9          FIG. 10
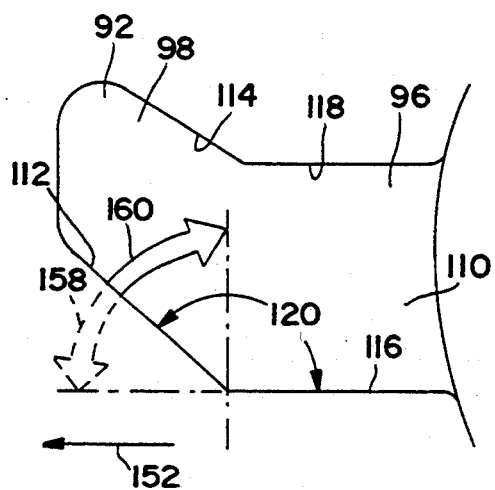
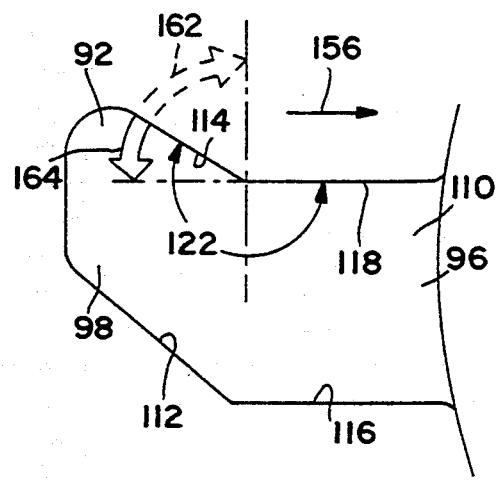
FIG. 11          FIG. 12

CENTRIFUGAL CLUTCH

BACKGROUND AND SUMMARY OF THE INVENTION

The present invention relates to centrifugal clutches. More particularly, the present invention relates to centrifugal clutches with the capability to vary torque capacity.

Clutches are used in a variety of mechanical systems to transmit torque from a motor to a driven part (e.g., drive belt or chain) of a mechanism. A clutch is a coupling used to connect and disconnect a driving and a driven part of a mechanism. A wide variety of clutches are known. A positive contact clutch transmits power from a driving shaft to a driven shaft by means of jaws or teeth. A disc clutch is able to transmit torque from an input shaft to an output shaft because of the frictional force developed between two plates or discs. A cone clutch is another type of axial friction clutch in which a cone fits in a cup. Electric clutches, hydraulic or pneumatic clutches, and overrunning clutches are also used to produce torque transmission.

A centrifugal clutch is designed to "engage" and transmit torque from an input shaft to an output shaft whenever some minimum rotational speed has been exceeded. The input shaft imparts centrifugal force to clutch shoes attached to the input shaft. The centrifugal force acts on the clutch shoes and moves the clutch shoes radially outward from the input shaft axis of rotation and into engagement with a housing connected to the output shaft. The torque capacity of a conventional centrifugal clutch is a function of the input shaft rate of rotation and the weight of the clutch shoes. It is known to attach springs between the clutch shoes to control the rate of rotation at which the clutch "engages".

It would be advantageous to provide a centrifugal clutch that can be assembled to provide a differential or equal torque capacity for opposite directions of rotation with a minimum number of parts. A centrifugal clutch with the capability of various torque capacities for opposite directions of rotation allows the output shaft to provide different torque capacities for opposite directions of rotation to an output mechanism. The cost of manufacturing is reduced and ease of assembly is increased by providing a centrifugal clutch with a minimum number of parts.

In accordance with the present invention, a centrifugal clutch includes a pair of clutch shoes and a rotor. The clutch also includes means for holding the clutch shoes and the rotor in engaged relation so that rotation of the rotor at a speed in excess of a minimum speed imparts enough centrifugal force to the clutch shoes to move the clutch shoes in a radially outwardly direction from the rotor axis of rotation to grip and rotate the holding means, thereby producing torque transmission.

Each clutch shoe is formed to include at least one drive arm-receiving pocket. The rotor includes at least one rotor arm extending into one of the drive arm-receiving pockets so that the rotor arm drives the clutch shoe to impart centrifugal force to the clutch shoe during rotation of the rotor. The drive arm-receiving pocket includes an inlet channel and a drive channel communicating with the inlet channel. An open mouth defines the inlet into the inlet channel and the rotor arm passes through the open mouth inlet and the inlet channel and includes a drive arm that extends into the drive channel.

Illustratively, one of the drive arm-receiving pockets is shaped to mate with the rotor drive arm that lies therein to either increase or decrease the torque capacity of the clutch depending upon the direction of rotation of the rotor. It is the shape of the side walls of the drive channel that contribute, in part, to achieve a change in the torque capacity of the clutch. Spaced-apart "aggressive" and "non-aggressive" cam follower walls define the drive channel. Because of their shapes, urging the rotor drive arm against an aggressive cam follower wall during rotation of the rotor in one direction will increase the torque capacity of the clutch and urging the same rotor drive arm against a non-aggressive cam follower wall during rotation of the rotor in the opposite direction will decrease the torque capacity of the clutch. The aggressive cam follower wall borders one edge of the drive channel and faces toward the open mouth and the non-aggressive cam follower wall borders another edge of the drive channel and faces away from the open mouth.

The rotor drive arm engages the aggressive cam follower wall in the clutch shoe when the rotor rotates about an axis of rotation in a first direction (e.g., clockwise) creating a force component directed radially outward from the axis of rotation to supplement the centrifugal force acting on the clutch shoes. The supplemental force created by the rotor drive arm acting on the aggressive cam follower increases the torque capacity of the clutch.

The rotor drive arm engages the non-aggressive cam follower wall in the clutch shoe when the rotor rotates in an opposite second direction (e.g., counterclockwise) creating a force component directed radially inward toward the axis of rotation to diminish the centrifugal force acting on the clutch shoes. The diminishment force created by the rotor drive arm acting on the non-aggressive cam follower wall decreases the torque capacity of the clutch.

Illustratively, the rotor includes a rotor hub and six rotor arms projecting radially outwardly from the rotor hub like spokes on a wheel. The six rotor arms include two drive arms and four retainer arms.

In preferred embodiments, the holding means provided in the clutch is a clutch drum. Each clutch shoe includes six clutch shoe pockets arranged to lie in the clutch drum so that the six clutch shoe pockets lie adjacent to the rotor. Each clutch shoe includes a top side and a bottom side. The top side is formed to include three of the six clutch shoe pockets and the bottom side is formed to include the remaining three clutch shoe pockets. On each side, a drive arm-receiving pocket is located centrally between two retainer arm-receiving pockets. One drive arm and two retainer arms extend into three of the pockets formed in one clutch shoe and one drive arm and two retaining arms extend into three of the pockets formed in the other clutch shoe.

Advantageously, each of the clutch shoes can be oriented in one of several patterns inside the clutch drum at the option of a user so that the drive arm engages either the drive arm-receiving pocket on the top side of the clutch shoe or the drive arm-receiving pocket on the bottom side of the clutch shoe. The shape of the drive arm-receiving pocket on the top side is different than the shape of the drive arm-receiving pocket on the bottom side so that the clutch has one torque capacity if the rotor drive arm extends into the "top side" drive arm-receiving pocket and a different torque capacity if the drive shoe is turned upside down in the clutch housing and the rotor arm extends into the "bottom side" drive arm-receiving pocket.

It will be understood that it is possible to change the torque capacity of a centrifugal clutch in accordance with the present invention simply by inverting the position of one or both clutch shoes inside the clutch housing when the centrifugal clutch is not in use and when the clutch shoe has differently shaped drive arm-receiving pockets on its top and bottom sides. It is also possible to change the torque capacity by changing the direction of rotation of the rotor when the rotor drive arms engage certain specially shaped drive arm-receiving pockets having aggressive cam follower walls on one side of the drive arm-receiving pocket and a non-aggressive cam follower wall on the other side of the drive arm-receiving pocket.

One option is to orient both clutch shoes bottom side up so that both rotor drive arms engage the bottom side drive arm-receiving pockets. Illustratively, the bottom side drive arm-receiving pockets have left side walls configured to provide aggressive cam followers that mate with the rotor drive arms to create supplemental forces that increase the torque capacity of the clutch when it is rotated in a first direction. Illustratively, the bottom side drive arm-receiving pockets also have right side walls configured to provide non-aggressive cam followers that mate with the rotor drive arms to create diminishment forces that decrease the torque capacity of the clutch when it is rotated in an opposite second direction. This type of pocket is sometimes called a "differential torque" drive arm-receiving pocket herein.

A second option is to orient both clutch shoes top side up so that both drive arms engage the top side drive arm-receiving pockets. Illustratively, the top side drive arm-receiving pockets have left and right side walls that are configured to produce no supplemental or diminishment forces when engaged by the rotor drive arms during operation of the centrifugal clutch. This type of pocket is sometimes called an "equal torque" drive arm-receiving pocket herein. Therefore, the torque capacity of the clutch remains the same and is neither increased nor decreased by engagement of the rotor drive arms and the walls of the top side drive arm-receiving pockets in the clutch shoes. It will be understood that in this embodiment, the torque capacity of the clutch is not varied by changing the direction of rotation of the rotor because none of the side walls of the top side drive arm-receiving pockets are configured to function as either aggressive or non-aggressive cam followers.

Of course, many other variations are possible based on the shape, configuration, and orientation of the rotor drive arms and the drive arm-receiving pockets in the clutch shoes. For example, one clutch shoe could be formed to include a drive arm-receiving pocket with an aggressive cam follower wall on one side of the drive channel and another "more aggressive" aggressive cam follower wall on the other side of the drive channel. Likewise, another clutch shoe could be formed to include a drive arm-receiving pocket with a non-aggressive cam follower wall on one side of the drive channel and another "less aggressive" non-aggressive cam follower wall on the other side of the drive channel.

Illustratively, a motor-driven power input shaft is attached to the rotor and a power output shaft is attached to the clutch drum. In operation, the motor-driven power input shaft rotates the rotor causing the rotor arms to rotate the clutch shoes. Once the rotor is turning at a fast enough speed, the rotor arms drive the clutch shoes to impart enough centrifugal force to the clutch shoes to move the shoes outwardly to grip the clutch drum containing the rotor and the clutch shoes. This gripping action causes the drum to rotate with the rotor, thereby causing the power output shaft to rotate with the power input shaft and produce torque transmission.

The torque capacity of the clutch can be varied by orienting the clutch shoes in the housing so that the rotor drive arms engage either the top side or bottom side drive arm-receiving pockets. When the rotor drive arm engages the top side drive arm-receiving pocket, the torque capacity of the clutch is solely a function of the centrifugal force acting on the clutch shoes to move the clutch shoes radially outward into engagement with the housing. When the rotor drive arm engages the bottom side drive arm-receiving pocket, the torque capacity of the clutch can be further varied by selecting one of the two available directions of rotation of the rotor. For example, rotating the rotor in the first direction of rotation (e.g., clockwise) causes the drive arm and bottom side drive arm-receiving pocket to engage and create a supplemental force that increases the torque capacity of the clutch. Alternatively, rotating the rotor in the opposite second direction of rotation (e.g., counterclockwise) causes the drive arm and bottom side drive arm-receiving pocket to engage and create a diminishment force that decreases the torque capacity of the clutch.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 9 is a partial sectional view similar to FIG. 6 showing the drive arm assembled in the equal torque drive arm-receiving pocket;

FIG. 10 is a partial sectional view of the centrifugal clutch of FIG. 9 in an engaged "torque-transmitting" position and rotating in a first direction so that a drive wall of the drive arm engages a driven wall in the equal torque drive arm-receiving pocket causing the clutch torque capacity to be a function of centrifugal force alone;

FIG. 11 is a diagrammatic view of one differential torque drive arm-receiving pocket showing the allowable range of angles for the aggressive cam follower wall;

FIG. 12 is a diagrammatic view of one differential torque drive arm-receiving pocket showing the allowable range of angles for the non-aggressive cam follower wall;

DETAILED DESCRIPTION OF THE DRAWINGS

Figure 1:
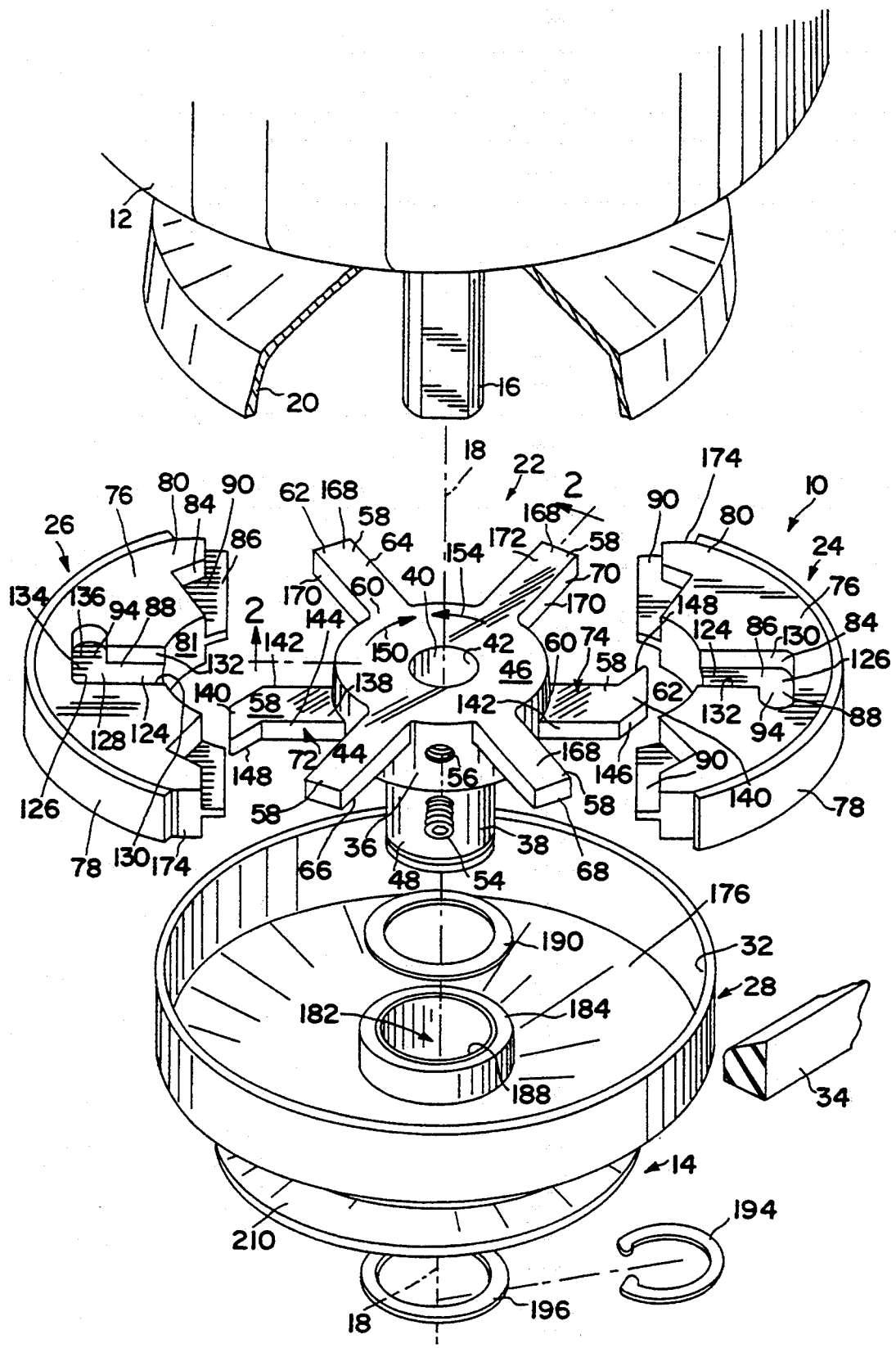
FIG. 1 is a perspective exploded assembly view of a centrifugal clutch in accordance with the present invention showing a rotor with six rotor arms including two drive arms, a pair of clutch shoes, and a clutch drum for holding the rotor and clutch shoes together and showing the location of the centrifugal clutch to enable it to connect and disconnect a rotatable motor drive shaft to a rotatable sheave engaging a drive belt.

The components of a centrifugal clutch assembly 10 are illustrated in FIG. 1. Clutch 10 is used to control the transmission of torque from a motor 12 to a drive belt sheave 14. One advantage of the assembly 10 is that the torque capacity of the clutch 10 can be varied.

Figure 2:
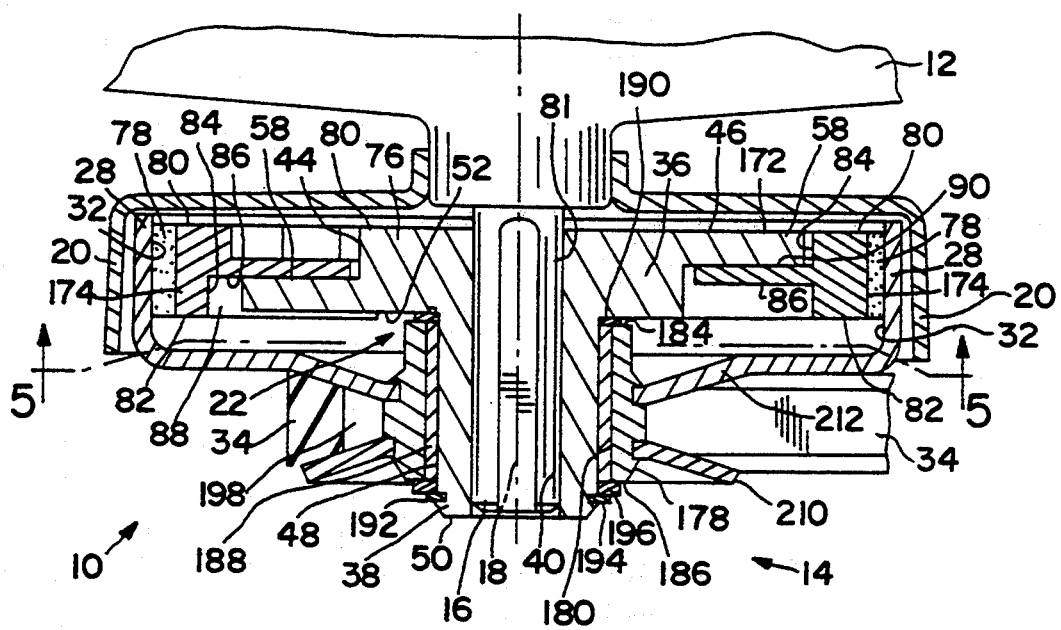
FIG. 2 is a sectional view of the assembled centrifugal clutch of FIG. 1 taken along line 2—2 of FIG. 1 showing a rotor engaging two clutch shoes inside a clutch drum.

The motor 12 contains a motor drive shaft 16 which provides the input power to the clutch 10. The motor drive shaft 16 has an axis of rotation 18. The motor 12 also includes a clutch cover 20 which overlaps the perimeter of clutch 10 as shown in FIG. 2.

Figure 6:
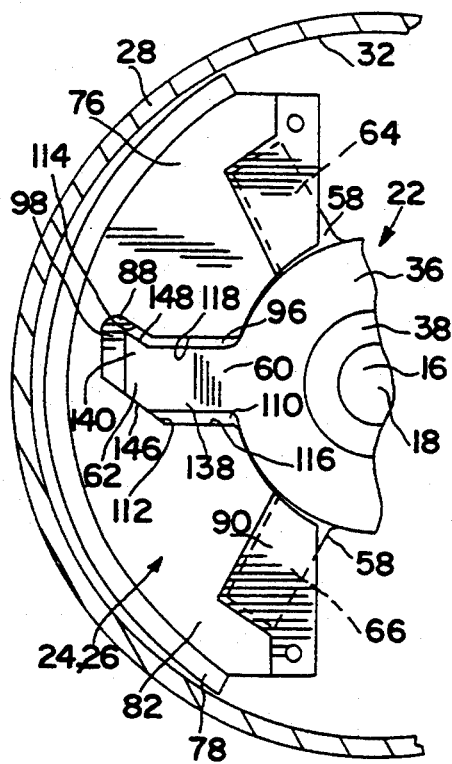
FIG. 6 is a partial sectional view similar to FIG. 5 showing the drive arm assembled in the differential torque drive arm-receiving pocket.
Figure 7:
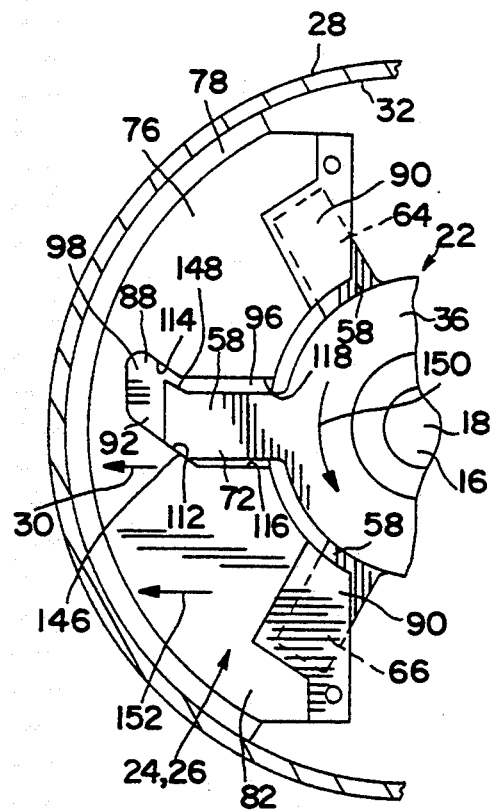
FIG. 7 is a partial sectional view of the centrifugal clutch of FIG. 6 in an engaged "torque-transmitting" position and rotating about an axis of rotation in a first direction so that an aggressive cam wall of the drive arm engages an aggressive cam follower wall in the differential torque drive arm-receiving pocket to create a supplemental force directed radially outward from the axis of rotation that increases the torque capacity of the clutch.
Figure 8:
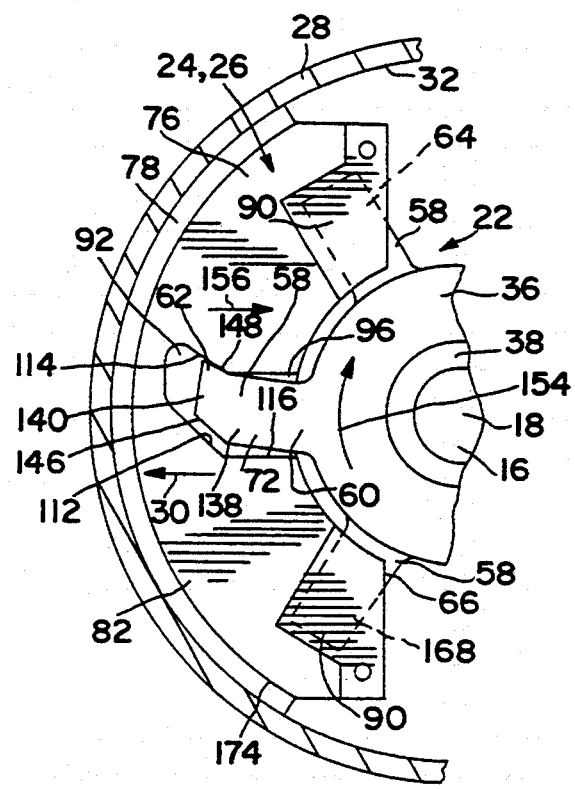
FIG. 8 is a partial sectional view of a centrifugal clutch of FIG. 6 in an engaged "torque transmitting" position and rotating in a second direction so that a non-aggressive cam wall of the drive arm engages a non-aggressive cam follower wall in the differential torque drive arm-receiving pocket to create a diminishment force directed radially inward toward the axis of rotation that decreases the torque capacity of the clutch.

The clutch 10 includes a rotor 22, clutch shoes 24, 26, and a clutch drum or housing 28. The rotor 22 is rotated by the motor drive shaft 16 during operation of the motor 12. The rotor 22 engages and rotates the clutch shoes 24, 26. The clutch shoes 24, 26 engage the clutch drum 28 when the motor drive shaft 16 rotates at a speed greater than the minimum required to impart enough centrifugal force to the clutch shoes 24, 26 such that the clutch shoes 24, 26 move from a disengaged position, as shown in FIGS. 6 and 9, in a radially outward direction 30 from the axis of rotation 18 as shown in FIGS. 7, 8, and 10 to come into contact with an inner side wall 32 of the clutch drum 28. When the clutch shoes 24, 26 engage the clutch drum 28, the clutch 10 operates to transmit torque from the motor 12 to the drive belt sheave 14 to turn a drive belt 34 riding on drive belt sheave 14.

The rotor 22 has an axis of rotation 18, a relatively thick portion, rotor hub 36, and a thinner portion, rotor axle 38, with a cylindrical bore 40 running through both portions 36, 38. The rotor hub 36 has an inner cylindrical surface 42, an outer cylindrical surface 44, and a flat surface 46 which faces toward the motor 12, as shown in FIG. 2. The rotor axle 38 has an outer cylindrical surface 48 and a flat surface 50 facing away from the motor 12. A radially outwardly extending annular side wall 52 connects the outer cylindrical surface 44 of the rotor hub 36 to the outer cylindrical surface 48 of the rotor axle 38. The rotor 22 is connected to the motor drive shaft 16 by sliding the motor drive shaft 16 into the cylindrical bore 40 of the rotor hub 36 and rotor axle 38 and tightening a drive shaft set screw 54 through an aperture 56 formed in the rotor hub 36. This connection allows the motor drive shaft 16 to transmit torque to the rotor 22.

The outer cylindrical surface 44 of the rotor hub 36 has a plurality of rotor arms 58 appended to it which rotate about the axis of rotation 18 during operation of motor 12. Each rotor arm 58 includes a proximal end 60 appended to the rotor hub 36 and a distal end 62 to extend into and engage with one of the clutch shoes 24, 26. In the illustrated embodiment, the rotor arms 58 include a first set of retainer arms 64, 66, 68, 70 and a second set of drive arms 72, 74.

Each of clutch shoes 24, 26 includes a shoe body 76, and friction material lining 78. The shoe body 76 includes a top side 80 and a bottom side 82. The shoe body 76 includes an inner wall 81 arranged adjacent to the rotor 22 and a perimeter or annular outer wall 174 arranged adjacent to clutch drum 28. The shoe body 76 contains pockets which are defined in the shoe body 76 by an interior side wall 84 and an interior bottom wall 86 arranged in paired adjacent relation as shown best in FIG. 1. Each shoe body 76 may have a plurality of pockets. In the preferred embodiment, shown best in FIGS. 3 and 4, the top side 80, and bottom side 82 of each clutch shoe 24, 26 have one centrally located drive arm-receiving pocket 88 and two laterally spaced retainer arm-receiving pockets 90 arranged to lie on opposite sides of the centrally located drive arm-receiving pocket 88.

The drive arm-receiving pockets 88 on the bottom side and top side 80 of each clutch shoe 24, 26 are shaped differently to provide different clutch torque capacities. The drive arm-receiving pocket 88 on the bottom side 82 is sometimes called a differential torque drive arm-receiving pocket 92 because one torque capacity is obtained when the clutch 10 rotates a first direction 150 and another torque capacity is obtained when the clutch 10 rotates in a second direction 154. The drive arm-receiving pocket 88 on the top side 80 is sometimes called an equal torque drive arm-receiving pocket 94 because the clutch 10 torque capacity is the same when the clutch 10 rotates in a first direction 150 and a second direction 154.

Figure 3:
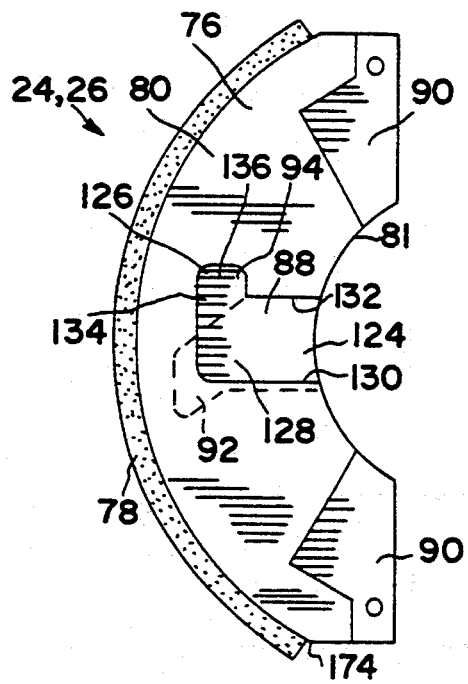
FIG. 3 is a view of a top side of the left-side clutch shoe shown in FIGS. 1 and 2 showing the location of a "differential torque" drive arm-receiving pocket on a bottom side of the clutch shoe and an "equal torque" drive arm-receiving pocket on a top side of the clutch shoe.
Figure 4:
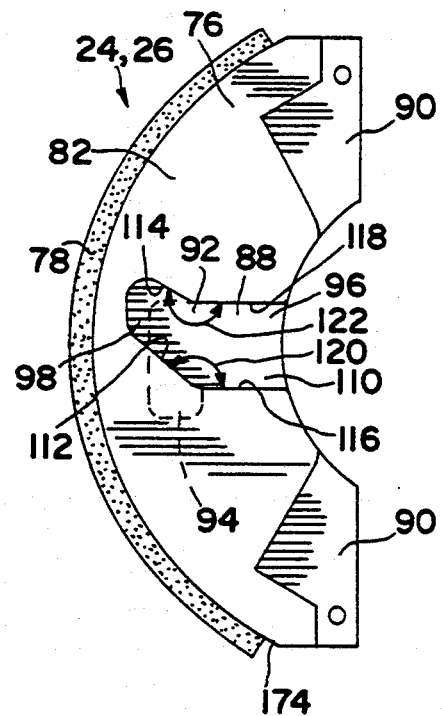
FIG. 4 is a view of the bottom side of the left-side clutch shoe shown in FIGS. 1 and 2 showing the location of the differential torque drive arm-receiving pocket on the bottom side of the clutch shoe and an equal torque drive arm-receiving pocket on the top side of the clutch shoe.

The differential torque drive arm-receiving pocket 92 includes an inlet channel 96 and a drive channel 98, as shown in FIG. 4. An open mouth 110 defines the inlet into the inlet channel 96. Spaced-apart inlet walls 116, 118 define the inlet channel 96. A spaced-apart aggressive cam follower wall 112 and a non-aggressive cam follower wall 114 define the drive channel 98. As shown in FIGS. 3 and 4, the aggressive cam follower wall 112 faces toward the open mouth 110 and the non-aggressive cam follower wall 114 faces away from the open mouth 110. The aggressive cam follower wall 112 and the inlet wall 116 are arranged to define an included angle 120 therebetween lying within the differential torque drive arm-receiving pocket 92 that is greater than 90° and less than 180°, as shown in FIG. 11 The non-aggressive cam follower wall 114 and the inlet wall 118 are arranged to define an included angle 122 therebetween lying within the differential torque drive arm-receiving pocket 92 that is greater than 180° and less than 270° as shown in FIG. 12. In the illustrated embodiment, the angle 120 is 139° and the angle 122 is 207°. However, in alternative embodiments, any angle within the specified range may be used.

The equal torque drive arm-receiving pocket 94 includes a drive channel 124 and a receiving channel 126, as shown in FIG. 3. The drive channel 124 extends radially outward from the axis of rotation 18 a predetermined distance to a distal end 128. The receiving channel 126 extends from the distal end 128 of the drive channel 124 in a direction perpendicular to the drive channel 124. Spaced-apart driven walls 130, 132 define the drive channel 124. The receiving channel includes a rectangular portion 134 and a semi-circular portion 136.

Figure 5:
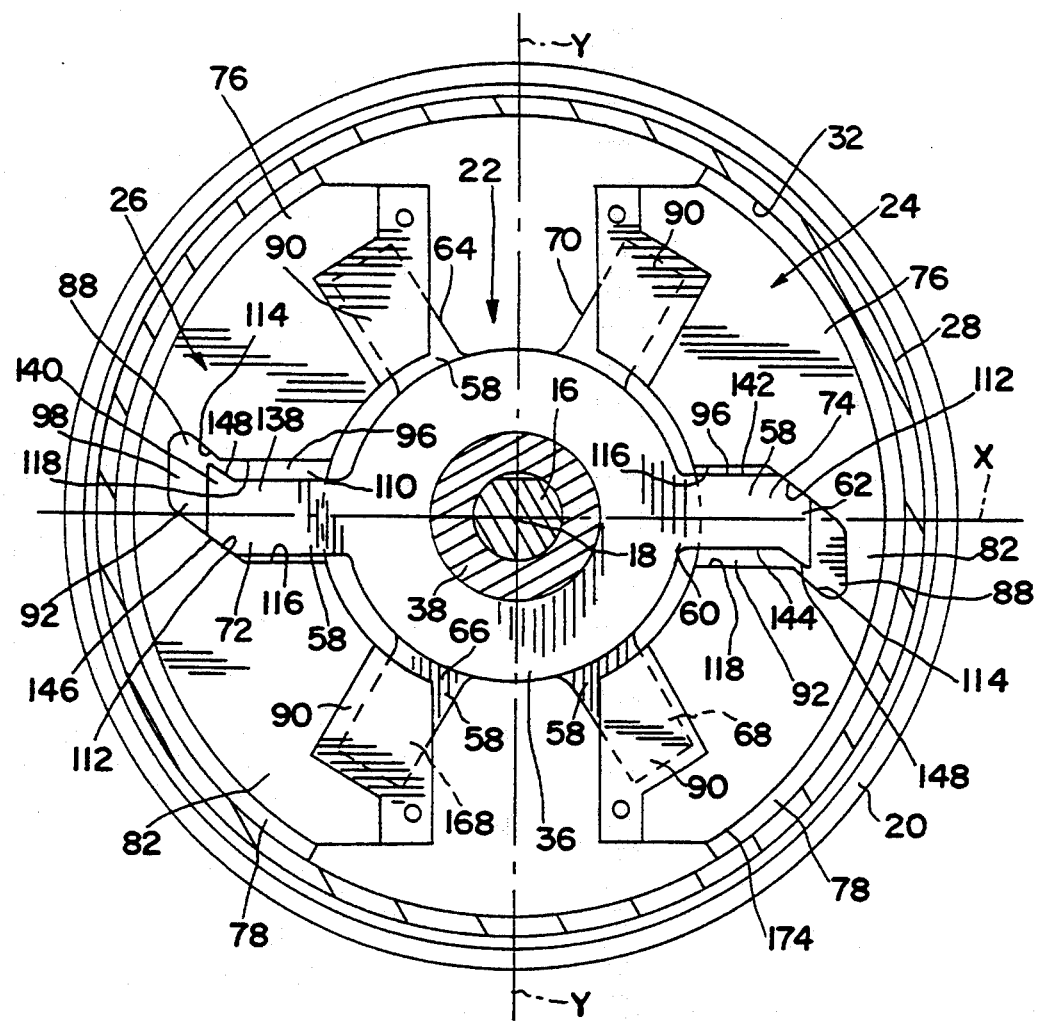
FIG. 5 is a sectional view taken along line 5—5 of FIG. 2 showing the clutch shoes assembled in a first orientation so that both drive arms engage the differential torque drive arm-receiving pockets.

The retainer arms 64, 66, 68, 70 extend into and engage the retainer arm-receiving pockets 90, as shown in FIG. 5. The drive arms 72, 74 extend into and engage the drive arm-receiving pockets 88, as shown in FIG. 5. By engaging in pockets 88, 90, the rotor arms 58 transmit the torque produced by the motor 12 to the clutch shoes 24, 26. The drive arms 72, 74 are intended to transmit torque while the retainer arms 64, 66, 68, 70 are intended to maintain engagement of the drive arms 72, 74 to the clutch shoes 24, 26.

Due to their different function, the drive arms 72, 74 and retainer arms 64, 66, 68, 70 are shaped somewhat differently as shown in FIGS. 1 and 5. Each drive arm 72, 74 includes a rectangular portion 138 and a trapezoidal portion 140. Spaced-apart drive walls 142, 144 define the rectangular portion 138 and a spaced-apart aggressive cam wall 146 and a non-aggressive cam wall 148 define the trapezoidal portion 140. The aggressive cam wall 146 is arranged to lie in substantially parallel mating relation with the aggressive cam follower wall 112 of the differential torque drive arm-receiving pocket 92. The non-aggressive cam wall 148 is arranged to lie in substantially parallel mating relation with the non-aggressive cam follower wall 114 of the differential torque drive arm-receiving pocket 92. In alternative embodiments, the drive arm 72, 74 may be of any geometry that allows the drive arm 72, 74 to engage the aggressive cam follower wall 112 and non-aggressive cam follower wall 114.

When the drive arm 72, 74 is assembled in the differential torque drive arm-receiving pocket 92, the rectangular portion 138 lies in the inlet channel 96 and the trapezoidal portion 140 lies in the drive channel 98. When the rotor 22 is rotating in the first direction 150, the aggressive cam wall 146 of the drive arm 72, 74 comes into contact with the aggressive cam follower wall 112 of the differential torque drive arm-receiving pocket 92. In response to the rotation in direction 150, the clutch shoes 24, 26 move radially outward in direction 30 due to centrifugal force and a supplemental force 152 created by the aggressive cam wall 146 of the drive arm 72, 74 engaging the aggressive cam follower wall 112 of the differential torque drive arm-receiving pocket 92.

The clutch 10 may also rotate in the second direction 154 which is opposite of direction 150 as shown in FIGS. 7 and 8. This allows the drive belt sheave 14 to rotate in either a forward or reverse direction. The clutch 10 changes direction of rotation 150, 154 by controlling the motor 12 so that the motor drive shaft 16 changes direction of rotation 150, 154. The motor drive shaft 16 transfers the change in direction of rotation 150, 154 to the rotor 22 which in turn changes the direction of rotation 150, 154 of the clutch shoes 24, 26. When the clutch shoes 24, 26 engage with the inner side wall 32 of the clutch drum 28 the change in direction of rotation 150, 154 is transferred to the drive belt sheave 14.

The clutch shoes 24, 26 engage with the inner side wall 32 of the clutch drum 28 at a higher torque capacity when rotating in direction 150 than direction 154. When the clutch shoes 24, 26 are rotating in direction 150 they move radially outward in direction 30 due to a combination of centrifugal force and the radially outwardly directed supplemental force component 152 created by the aggressive cam walls 146 of the drive arms 72, 74 acting on the aggressive cam follower walls 112 of the differential torque drive arm-receiving pockets 92. The addition of the radially outwardly directed supplemental force component 152 to the centrifugal force increases the torque capacity of the clutch 10. When the clutch shoes 24, 26 are rotating in direction 154 they move radially outward 30 due to centrifugal force overcoming a radially inwardly directed diminishment force 156 created by the non-aggressive cam walls 148 of the drive arms 72, 74 acting on the non-aggressive cam follower walls 114 of the differential torque drive arm-receiving pockets 92. The radially inwardly directed diminishment force component 156 on the centrifugal force decreases the torque capacity of the clutch 10. Therefore, the clutch 10 is more "aggressive" when rotating in direction 150 than when rotating in direction 154 because the clutch 10 will engage the inner wall 32 of the clutch drum 28 at a higher torque capacity when rotating in direction 150 than in direction 154.

For a given rate of rotation of rotor 22 and weight of clutch shoes 24, 26, the torque capacity of the clutch 10 is determined by the angle 120, 122 between the inlet wall 116, 118 and the cam follower wall 112,114. The inlet wall 116 and aggressive cam follower wall 112 include the angle 120 lying in the differential torque drive arm-receiving pocket 92 that is greater than 90° and less than 180° as shown in FIG. 11 As the angle 120 increases in direction 158 from 90° to 180° the torque capacity of the clutch 10 decreases because as the angle 120 increases the supplemental force component 152 directed radially outward decreases. Similarly, as the angle 120 decreases in direction 160 from 180° to 90°, the torque capacity of the clutch 10 increases. The inlet wall 118 and non-aggressive cam follower wall 114 include the angle 122 lying in the differential torque drive arm-receiving pocket 92 that is greater than 180° and less than 270° as shown in FIG. 12 As the angle 122 increases in direction 162 from 180° to 270° the torque capacity of the clutch 10 decreases because as the angle 122 increases the diminishment force component 156 directed radially inward increases. Similarly, as the angle 122 decreases in direction 164 from 270° to 180° the torque capacity of the clutch 10 increases.

When the drive arm 72, 74 is assembled into the equal torque drive arm-receiving pocket 94, the rectangular portion 138 lies in drive channel 124 and the trapezoidal portion 140 lies in the receiving channel 126. When the rotor 22 rotates in direction 150 or direction 154, the clutch shoes 24, 26 move radially outward in direction 30 from the axis of rotation 18 due to centrifugal force alone, as shown in FIGS. 9 and 10, because neither a supplemental nor a diminishment force component is created. Rotation in direction 150 results in drive wall 142 engaging driven wall 130. Rotation in direction 154 results in drive wall 144 engaging driven wall 132.

Figure 13:
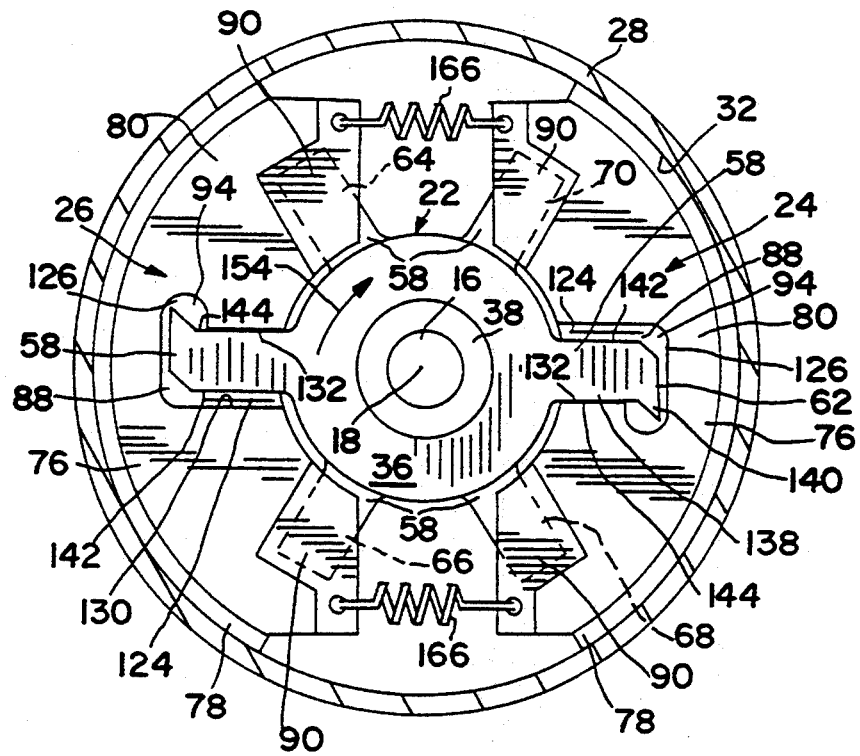
FIG. 13 is a sectional view similar to FIG. 5 showing the clutch shoes assembled in a second orientation so that both rotor drive arms engage the equal torque drive arm-receiving pockets and optional retraction springs assembled between the clutch shoes.
Figure 14:
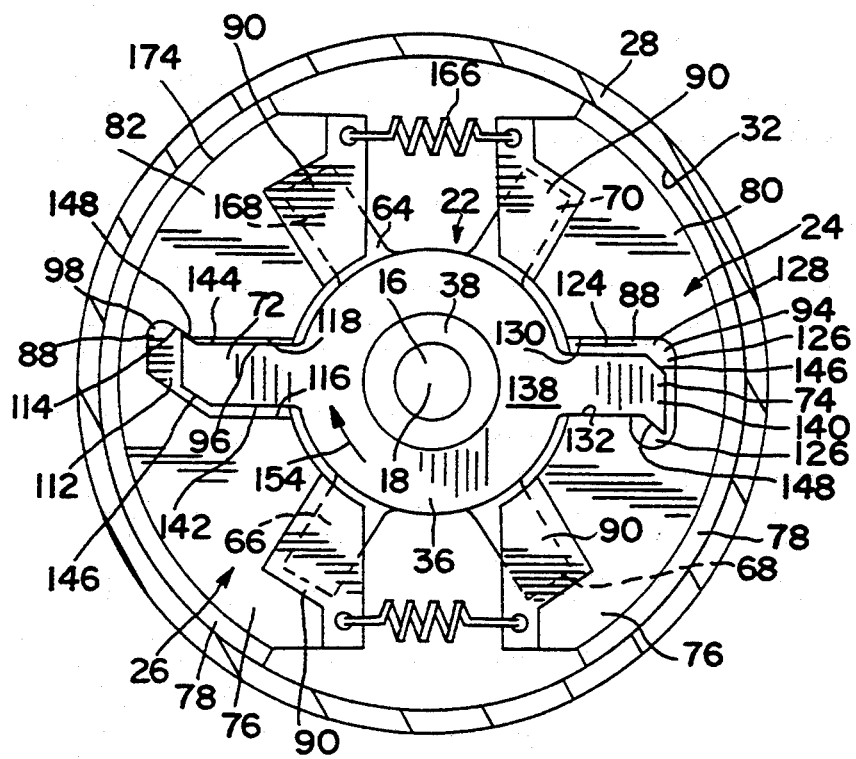
FIG. 14 is a sectional view showing the clutch shoes assembled in a third orientation so that one rotor drive arm engages the differential torque drive arm-receiving pocket and one rotor drive arm engages the equal torque drive arm-receiving pocket and optional retraction springs assembled between the clutch shoes.

Each of the pair of clutch shoes 24, 26 may be assembled so that the drive arm 72, 74 is assembled either in the differential torque drive arm-receiving pocket 92 or the equal torque drive arm-receiving pocket 94. Thus, for one pair of clutch shoes 24, 26, three different torque capacities may be achieved. First, both clutch shoes 24, 26 may be assembled in a first orientation so that both drive arms 72, 74 engage the differential torque drive arm-receiving pockets 92, as shown in FIG. 5. Assembling the clutch shoes 24, 26 in the first orientation allows the clutch 10 to have a higher torque capacity when rotating in the first direction 150 than when rotating in the second direction 154. Second, both clutch shoes 24, 26 may be assembled in a second orientation so that both drive arms 72, 74 engage the equal torque drive arm-receiving pockets 94, as shown in FIG. 13. Assembling the clutch shoes 124 in the second orientation allows the clutch 10 to have a torque capacity due to centrifugal force alone for both the first direction 150 of rotation and the second direction 154 of rotation. Third, the clutch shoes 24, 26 may be assembled in a third orientation so that one drive arm 72, 74 engages the differential torque drive arm-receiving pocket 92 and one drive arm 72, 74 engages the equal torque drive arm-receiving pocket 94, as shown in FIG. 14.

Figure 16:
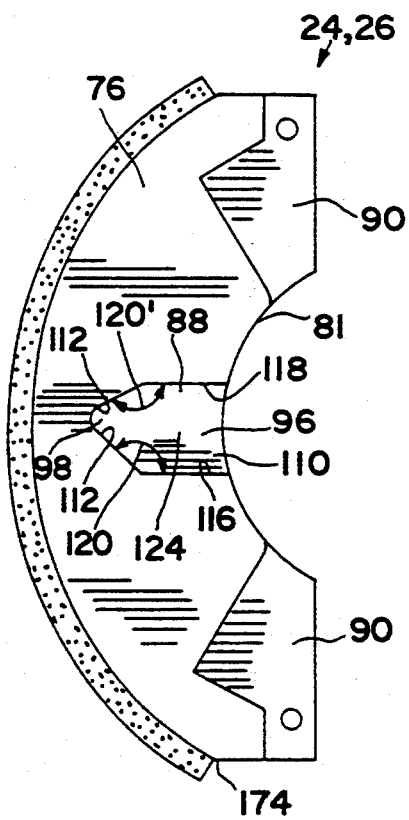
FIG. 16 and FIG. 17 show alternative drive torque arrangements for providing varied drive forces for the clutch.
Figure 17:
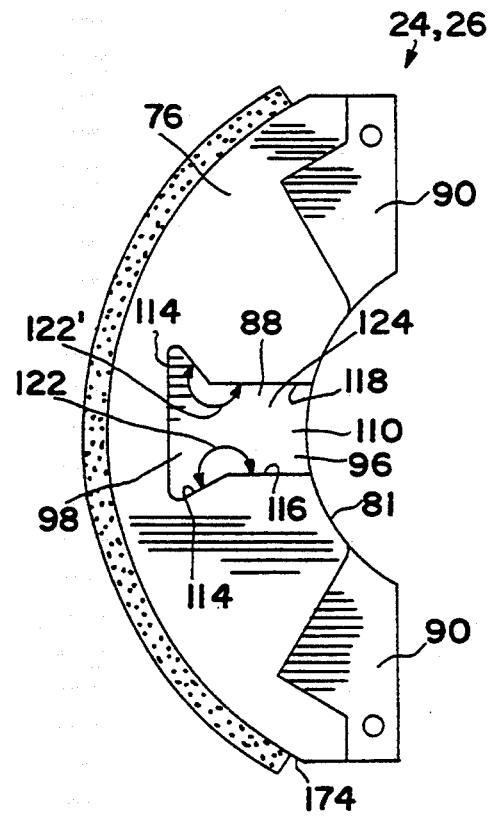

In alternative embodiments, the clutch shoes 24, 26 may be formed with any combination of aggressive cam follower walls 112, non-aggressive cam follower walls 114, and driven walls 130, 132. Therefore, it would be possible to have a clutch shoe pocket including: (i) two spaced-apart aggressive cam follower walls 112 having one aggressive cam follower wall 112 on one side of the drive channel 124 and another "more aggressive" aggressive cam follower wall 112 on the other side of the drive channel as evidenced by the differently sized angles 120 and 120' (see FIG. 16); (ii) two spaced-apart non-aggressive cam follower walls 114 having one non-aggressive cam follower wall 114 on one side of the drive channel 124 and another "less aggressive" non-aggressive cam follower wall on the other side of the drive channel 124; (iii) one aggressive cam wall 112 and one drive wall 130, 132; and (iv) one non-aggressive cam wall 114 and one driven wall 130, 132. The determination of which walls 112, 114, 130, 132 to use in the drive arm-receiving pockets 88 is based upon the torque requirements of the output system that the clutch 10 is transferring power to from the motor 12.

In alternative embodiments, retraction springs 166 may be used to select the minimum rotation required by the motor 12 for the clutch shoes 24, 26 to engage with the clutch drum 28. The retraction springs 166 are positioned to lie between and interconnect clutch shoe 24 and clutch shoe 26, as shown in FIGS. 13 and 14. The spring constant of the retraction springs 166 is selected so that when the desired minimum rotation is achieved, the outward radial force acting on the clutch shoes 24, 26 overcomes the force of the springs 166, thereby causing the clutch shoes 24, 26 to contact the inner side wall 32 of the clutch drum 28.

Each retainer arm 64, 66, 68, 70 includes a rectangle-shaped portion 168, and a side wall 170, as shown in FIG. 1. The side wall 170 of the retainer arms 64, 66, 68, 70 may engage with the interior side walls 84 of the retainer arm-receiving pocket 90, but a significant amount of torque is transferred between the drive arms 72, 74 and drive arm-receiving pockets 88.

Figure 15:
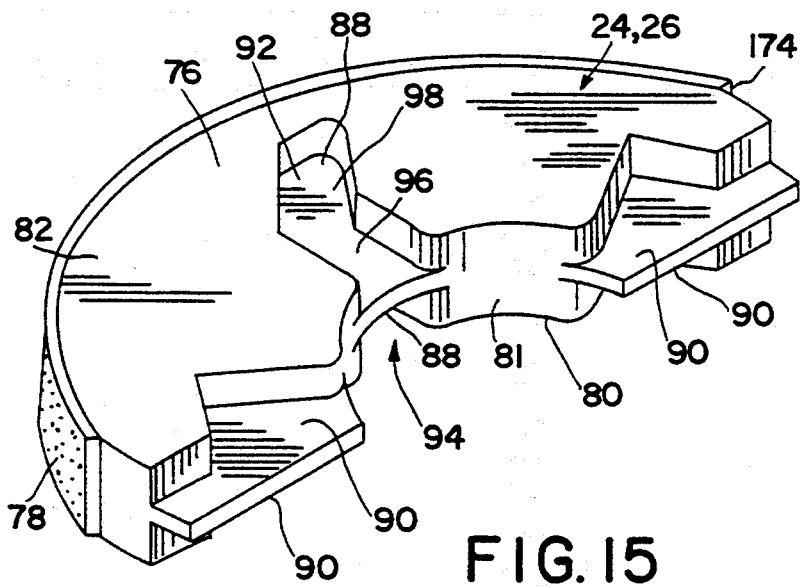
FIG. 15 is a perspective view of one clutch shoe showing the differential torque drive arm-receiving pocket centrally located between two retainer arm-receiving pockets on the bottom side of the clutch shoe and an inlet into the equal torque drive arm-receiving pocket centrally located between two retainer arm-receiving pockets on the top side of the clutch shoe.

The drive arms 72, 74 and retainer arms 64, 66, 68, 70 are located on the rotor hub 36 to maintain stability of the clutch shoes 24, 26. A "three point" design is used in the placement of the rotor arms 58 as this allows the clutch shoes 24, 26 to self-center and maintain stability. The "three point" design is accomplished by engaging one drive arm 72, 74 and two retainer arms 64, 66, 68, 70 per clutch shoe 24, 26. The "three-point" design allows each clutch shoe 24, 26 to be assembled so that the drive arm 72, 74 can engage either the differential torque drive arm-receiving pocket 92 or the equal torque drive arm-receiving pocket 94 because the clutch shoes 24, 26 include working surfaces on the bottom side 82 and top side 80, as shown in FIG. 15.

When the clutch shoe 24, 26 is assembled so that the drive arm 72, 74 engages the differential torque drive arm-receiving pocket 92 on the bottom side 82 of the clutch shoe 24, 26, the retainer arms 64, 66, 68, 70 engage the retainer arm-receiving pockets 90 on the top side 80 of the clutch shoe 24, 26. When the clutch shoe 24, 26 is assembled so that the drive arm 72, 74 engages the equal torque drive arm-receiving pocket 94 on the top side 80 of the clutch shoe 24, 26, the retainer arms 64, 66, 68, 70 engage the retainer arm-receiving pockets 90 on the bottom side 82 of the clutch shoe 24, 26.

The two drive arms 72, 74 are spaced 180° apart on the rotor hub 36 and extend radially outward from the outer cylindrical surface 44 of rotor hub 36 perpendicular to the axis of rotation 18 of the clutch 10. The four retainer arms 64, 66, 68, 70 extend outward from the outer cylindrical surface 44 of the rotor hub 36 as shown in FIG. 5. The retainer arms 64, 66, 68, 70 have a flat surface 172 which is flush with the flat surface 46 of the rotor hub 36. The placement of the retainer arms 64, 66, 68, 70 is symmetric about axis x—x and axis y—y as shown in FIG. 5. The location of the drive arms 72, 74 and retainer arms 64, 66, 68, 70 are fixed relative to each other with drive arm 72, extending between retainer arms 64 and 66 and drive arm 74 extending between rotor arms 68 and 70. The location of the drive arms 72, 74 and retainer arms 64, 66, 68, 70 allows the clutch shoe 24, 26 to self-center and maintain stability. In alternative embodiments, any suitable number and shape of drive arms 72, 74 and retainer arms 64, 66, 68, 70 may be used.

The clutch shoe 24, 26 includes friction material lining 78 which is placed on the perimeter 174 of the clutch shoes 24, 26. In alternative embodiments, the use of friction lining material 78 is optional.

The clutch drum 28 includes a round chamber 176 for containing the clutch shoes 24, 26, a drive belt sheave 14 for supporting and rotating a drive belt 34, and inner side wall 32, as shown in FIGS. 1 and 2. The drive belt 34 transmits the torque produced by the motor 12 and passed through clutch 10 to another mechanism (not shown). The clutch drum 28 includes a drum hub 178 which has an inner cylindrical surface 180 created by a cylindrical bore 182, an upper flat surface 184 which faces toward the clutch 10, and a lower flat surface 186 which faces away from the clutch 10.

The rotor 22 attaches to the clutch drum 28 by sliding the outer cylindrical surface 48 of the rotor axle 38 into the cylindrical bore 182 of the drum hub 178. An annular bronze bushing 188 is assembled between the outer cylindrical surface 48 of the rotor axle 38 and the inner cylindrical surface 180 of the drum hub 178 as shown in FIG. 2. The bronze bushing 188 does not transfer torque from the rotor axle 38 to the drum hub 178 but merely prevents the outer cylindrical surface 48 of the rotor axle 38 and the inner cylindrical surface 180 of the drum hub 178 from wearing. An upper washer 190 is assembled between the radially outwardly extending annular side wall 52 of the rotor 22 and the upper flat surface 184 of the drum hub 178 to prevent the surfaces from wearing.

In its assembled position, shown in FIG. 2, the rotor axle 38 extends through the cylindrical bore 182 of the drum hub 178 and past the lower flat surface 186 of the drum hub 178. The outer cylindrical surface 48 of the rotor axle 38 includes a groove 192 which in the assembled position is located between the lower flat surface 186 of the drum hub 178 and flat surface 50 of the rotor axle 38, as shown in FIG. 2. A C-shaped snap ring 194 is assembled in the groove 192 to hold the rotor 22 and clutch drum 28 together. A lower washer 196 is assembled between the C-shaped snap ring 194 and lower flat surface 186 of the drum hub 178 to prevent the surfaces from wearing.

The drive belt sheave 14 holds the drive belt 34 on a flat surface 198 between a lower sheave wall 210 and an upper sheave wall 212. In the illustrated embodiment, the drive belt sheave 14 is part of the clutch drum 28. However, in alternative embodiments, the drive belt sheave 14 may be a separate part coupled to the clutch drum 28. In the illustrated embodiment, the clutch 10 operates to transmit torque from the motor 12 to a drive belt sheave 14. However, the clutch 10 could transmit torque from a motor 12 to any power transmission device (not shown).

The motor drive shaft 16 rotates the rotor 22 which in turn rotates the rotor arms 58. The drive arms 72, 74 engage and rotate the clutch shoes 24, 26. The clutch shoes 24, 26 engage the clutch drum 28 when the motor drive shaft 16 rotates in direction 150 or direction 154 at a speed greater than the minimum required to impart enough centrifugal force on the clutch shoes 24, 26 such that the clutch shoes 24, 26 move radially outward in direction 30 from the axis of rotation 18 to come into contact with the inner surface 32 of the clutch drum 28. This is illustrated in FIGS. 6 and 7. In FIG. 6, the motor drive shaft 16 is stopped or rotating at a speed less than the minimum required and the clutch shoes 24, 26 are not engaged with the inner surface 32 of the clutch drum 28. As shown in FIG. 7, the motor drive shaft 16 is rotating at a speed greater than the minimum and the clutch shoes 24, 26 are engaged with the clutch drum 28. When the clutch 10 is in the non-engaged position, shown in FIG. 6, the clutch drum 28 and drive belt sheave 14 are not rotating and thus no torque is being transmitted by the drive belt 34. When the clutch 10 is in the engaged position, shown in FIG. 7, the clutch drum 28 and drive belt sheave 14 rotate and thus torque is being transmitted by the drive belt 34.

Although this invention has been described in detail with reference to certain embodiments, variations and modifications exist within the scope and spirit of the invention as described and as defined in the following claims.

I claim:

1. A centrifugal clutch comprising
   a clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel,
   a rotor having an axis of rotation and including a rotor arm extending into the drive arm-receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch, and
   a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor in the first direction at a speed greater than a minimum predetermined speed and during rotation of the rotor in the second direction at a speed greater than a minimum predetermined speed.

2. A centrifugal clutch comprising
   a clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel, a rotor having an axis of rotation and including a rotor arm extending into the drive arm-receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall 20 and creates a force directed radially inwardly toward the axis of rotation to decrease the torque capacity of the clutch, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, the rotor arm including a proximal end appended to the rotor, a distal end lying in the drive arm-receiving pocket, a rectangular portion extending from the proximal end of the rotor arm a predetermined distance to a distal end, and a trapezoidal portion extending from the distal end of the rectangular portion to the distal end of the rotor arm, the rectangular portion being arranged to engage the drive arm-receiving pocket in the inlet channel, the trapezoidal portion being arranged to engage the drive arm-receiving pocket in the drive channel, and the trapezoidal portion including an aggressive cam wall facing toward the aggressive cam follower wall and a non-aggressive cam wall facing toward the non-aggressive cam follower wall.

3. The clutch of claim 2, wherein the aggressive cam wall and aggressive cam follower wall are arranged to lie in substantially parallel mating relation and the non-aggressive cam wall and non-aggressive cam follower wall are arranged to lie in substantially parallel mating relation.

4. A centrifugal clutch comprising clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel, rotor having an axis of rotation and including a rotor arm extending into the drive arm-receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, the clutch shoe further including spaced-apart first and second inlet walls defining the inlet channel, the first inlet wall and aggressive cam follower wall being arranged to define a first included angle therebetween lying within the drive arm-receiving pocket that is greater than 90° and less than 180°, and the second inlet wall and non-aggressive cam follower wall being arranged to define a second included angle therebetween lying within the drive arm-receiving pocket that is greater than 180° and less than 270°.

5. The clutch of claim 4, wherein the first inlet wall and aggressive cam follower wall are arranged to define a third included angle therebetween lying within the drive arm-receiving pocket of 139° and the second inlet wall and non-aggressive cam follower wall are arranged to define a fourth included angle therebetween lying within the drive arm-receiving pocket of 207°.

6. The clutch of claim 2, wherein the clutch shoe has a top side and bottom side, the bottom side is formed to include the inlet channel, the drive channel, and the aggressive and non-aggressive cam follower walls cooperating to define the drive channel, the top side is formed to include a second drive arm-receiving pocket having a drive channel extending radially outward from the rotor axis of rotation a predetermined distance to a distal end and a receiving channel extending from the distal end of the drive channel in a direction perpendicular to the drive channel, the rectangular portion of the rotor arm is arranged to engage the drive arm-receiving pocket in the drive channel, and the trapezoidal portion of the rotor arm is arranged to engage the drive arm-receiving pocket in the receiving channel.

7. A centrifugal clutch comprising a clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel, a rotor having an axis of rotation and including a rotor arm extending into the drive arm-receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, a second clutch shoe being formed to include a second drive arm-receiving pocket having a second inlet channel, a second drive channel communicating with the second inlet channel, a second open mouth defining an inlet into the second inlet channel, and spaced-apart first and second aggressive cam follower walls defining the second drive channel and facing toward the second open mouth of the second inlet channel.

8. A centrifugal clutch comprising a clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel, a rotor having an axis or rotation and including a rotor arm extending into the drive arm-receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, the clutch further including a second clutch shoe being formed to include a second drive arm-receiving pocket having a second inlet channel, a second drive channel communicating with the second inlet channel, a second open mouth defining an inlet into the second inlet channel, and spaced-apart first and second non-aggressive cam follower walls defining the second drive channel and facing away from the second open mouth of the second inlet channel.

9. A centrifugal clutch comprising a clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel, a rotor having an axis of rotation and including a rotor arm extending into the drive arm-receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, the clutch shoe further comprising an inner wall arranged adjacent to the rotor, the aggressive cam follower wall facing toward the inner wall and the non-aggressive cam follower wall facing away from the inner wall.

10. A centrifugal clutch comprising a clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel, a rotor having an axis of rotation and including a rotor arm extending into the drive arm-receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, the clutch shoe further comprising an annular outer wall being arranged adjacent to the housing, the aggressive cam follower wall facing away from the annular outer wall and the non-aggressive cam follower wall facing toward the annular outer wall.

11. A centrifugal clutch comprising a clutch shoe formed to include a drive arm-receiving pocket having an inlet channel, a drive channel communicating with the inlet channel, an open mouth defining an inlet into the inlet channel, and spaced-apart aggressive and non-aggressive cam follower walls defining the drive channel, the aggressive cam follower wall facing toward the oven mouth of the inlet channel and the non-aggressive cam follower wall facing away from the open mouth of the inlet channel, a rotor having an axis of rotation and including a rotor arm extending into the drive arm receiving pocket, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, the clutch shoe further comprising an outer wall being arranged adjacent to the housing and friction lining material being situated on the outer wall between the outer wall and the housing, the aggressive cam follower wall facing away from the outer wall and the non-aggressive cam follower wall facing toward the outer wall.

12. A centrifugal clutch comprising a clutch shoe formed to include a drive arm-receiving pocket having an inlet channel, a drive channel communicating with the inlet channel, an open mouth defining an inlet into the inlet channel, and spaced-apart first and second non-aggressive cam follower walls defining the drive channel, the first and second non-aggressive cam follower walls facing away from the open mouth of the inlet channel, a rotor having an axis of rotation and including a rotor arm extending into the drive arm-receiving pocket, and a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outward from the axis of rotation to engage and rotate the inner wall during rotation of the rotor at a speed greater than a minimum, the clutch shoe further comprising an inner wall arranged adjacent to the rotor, the first and second non-aggressive cam follower walls facing away from the inner wall.

13. The clutch shoe of claim 12, wherein the rotor arm includes a proximal end appended to the rotor, a distal end lying in the drive arm-receiving pocket, a rectangular portion extending from the proximal end of the rotor arm a predetermined distance to a distal end, and a trapezoidal portion extending from the distal end of the rectangular portion to the distal end of the rotor arm, the rectangular portion is arranged to engage the drive arm-receiving pocket in the inlet channel, the trapezoidal portion is arranged to engage the clutch shoe pocket in the drive channel, and the trapezoidal portion includes a first non-aggressive cam wall facing toward the first non-aggressive cam follower wall and a second non-aggressive cam wall facing toward the second non-aggressive cam follower wall.

14. The clutch of claim 13, wherein the first non-aggressive cam wall and first non-aggressive cam follower wall are arranged to lie in substantially parallel mating relation and the second non-aggressive cam wall and second non-aggressive cam follower wall are arranged to lie in substantially parallel mating relation.

15. The clutch of claim 13, wherein the clutch shoe further includes spaced-apart first and second inlet walls defining the inlet channel, the first inlet wall and the first non-aggressive cam follower wall are arranged to define a first included angle therebetween lying within the drive arm-receiving pocket that is greater than 180° and less than 270°, and the second inlet wall and the second non-aggressive cam follower wall are arranged to define a second included angle therebetween lying within the drive arm-receiving pocket that is greater than 180° and less than 270°.

16. The clutch of claim 14, wherein the clutch has a top side and bottom side, the bottom side is formed to include the inlet channel, the drive channel, and the first and second non-aggressive cam follower walls cooperating to define the drive channel, the top side is formed to include a second drive arm-receiving pocket having a drive channel extending radially outward from the rotor axis of rotation a predetermined distance to a distal end and a receiving channel extending from the distal end of the drive channel in a direction perpendicular to the drive channel, the rectangular portion of the rotor arm is arranged to engage the drive arm-receiving pocket in the drive channel, and the trapezoidal portion of the rotor arm is arranged to engage the drive arm-receiving pocket in the receiving channel.

17. The clutch of claim 12, further comprising a second clutch shoe formed to include a second drive arm-receiving pocket having a second inlet channel, a second drive channel communicating with the second inlet channel, a second open mouth defining the second inlet channel, and spaced-apart first and second aggressive cam follower walls defining the second drive channel, and wherein the first and second aggressive cam follower walls define the second drive channel and face toward the second open mouth of the second inlet channel.

18. The clutch of claim 12, further comprising a second clutch shoe formed to include a second drive arm-receiving pocket having a second inlet channel, a second drive channel communicating with the second inlet channel, a second open mouth defining an inlet into the second inlet channel, and spaced-apart aggressive and non-aggressive cam follower walls defining the second drive channel, and wherein the aggressive cam follower wall faces toward the second open mouth end and the non-aggressive cam follower wall faces away from the second open mouth of the second inlet channel.

19. A centrifugal clutch comprising
a clutch shoe formed to include a drive arm-receiving pocket having an inlet channel, a drive channel communicating with the inlet channel, an open mouth defining an inlet into the inlet channel, and spaced-apart first and second aggressive cam follower walls defining the drive channel, the first and second aggressive cam follower walls facing toward the open mouth of the inlet channel,
a rotor having an axis of rotation and including a rotor arm extending into the drive arm-receiving pocket, and
a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outward from the axis of rotation to engage and rotate the inner wall during rotation of the rotor at a speed greater than a minimum, the clutch shoe further including an outer wall arranged adjacent to the housing, the first and second aggressive cam follower walls facing away from the outer wall.

20. The clutch of claim 19, wherein the rotor arm includes a proximal end appended to the rotor, a distal end lying in the drive arm-receiving pocket, a rectangular portion extending from the proximal end of the rotor arm a predetermined distance to a distal end, and a trapezoidal portion extending from the distal end of the rectangular portion to the distal end of the rotor arm, the rectangular portion is arranged to engage the drive arm-receiving pocket in the inlet channel, the trapezoidal portion is arranged to engage the clutch shoe pocket in the drive channel, the trapezoidal portion includes a first aggressive cam wall facing toward the first aggressive cam follower wall and a second aggressive cam wall facing toward the second aggressive cam follower wall.

21. The clutch of claim 20, wherein the first aggressive cam wall and first aggressive cam follower wall are arranged to lie in substantially parallel mating relation and the second aggressive cam wall and second aggressive cam follower wall are arranged to lie in substantially parallel mating relation.

22. The clutch of claim 20, wherein the clutch has a top side and bottom side, the bottom side is formed to include the inlet channel, the drive channel, and the first and second aggressive cam follower walls cooperating to define the drive channel, the top side is formed to include a second drive arm-receiving pocket having a drive channel extending radially outward from the rotor axis of rotation a predetermined distance to a distal end and a receiving channel extending from the distal end of the drive channel in a direction perpendicular to the drive channel, the rectangular portion of the rotor arm is arranged to engage the drive arm-receiving pocket in the drive channel, and the trapezoidal portion of the rotor arm is arranged to engage the drive arm-receiving pocket in the receiving channel.

23. The clutch of claim 20, wherein the clutch shoe further includes spaced-apart first and second inlet walls defining the inlet channel, the first inlet wall and the first aggressive cam follower wall are arranged to define a first included angle therebetween lying within the drive arm-receiving pocket that is greater than 90° and less than 180°, and the second inlet wall and the second aggressive cam follower wall are arranged to define a second included angle therebetween lying within the drive arm-receiving pocket that is greater than 90° and less than 180°.

24. The clutch of claim 19, further comprising a second clutch shoe formed to include a second drive arm-receiving pocket having a second inlet channel, a second drive channel communicating with the second inlet channel, a second open mouth defining an inlet into the second inlet channel, and spaced-apart aggressive and non-aggressive cam follower walls defining the second drive channel, the aggressive cam follower wall faces toward the second open mouth and the non-aggressive cam follower wall faces away from the second open mouth.

25. The clutch of claim 19, further comprising a second clutch shoe formed to include a second drive arm-receiving pocket having a second inlet channel, a second drive channel communicating with the second inlet channel, a second open mouth defining an inlet into the second inlet channel, and spaced-apart first and second non-aggressive cam follower walls define the second drive channel and face away from the second open mouth of the second inlet channel.

26. A method of selectively varying the torque capacity of a centrifugal clutch, the method comprising the steps of
providing a pair of clutch shoes, each clutch shoe being formed to include a first drive arm-receiving pocket defining a first torque capacity and a second drive arm-receiving pocket defining a second torque capacity, a rotor having an axis of rotation and including a drive arm arranged to engage the clutch shoe, and a housing including means for holding the pair of clutch shoes and the rotor in engaged relation, and
assembling the drive arm into one of the first drive arm-receiving pocket and the second drive arm-receiving pocket for each of the pair of clutch shoes.

27. The method of claim 26, wherein the drive arm is assembled in the first drive arm-receiving pocket, the first drive arm-receiving pocket is formed to include an inlet channel, a drive channel communicating with the inlet channel, an open mouth defining an inlet into the inlet channel, spaced-apart driven walls define the inlet channel, and spaced-apart aggressive and non-aggressive cam follower walls defining the drive channel, the aggressive cam follower wall faces toward the open mouth of the inlet channel and the non-aggressive cam follower wall faces away from the open mouth of the inlet channel.

28. The method of claim 27, wherein the drive arm is arranged in the first drive arm-receiving pocket so that a rectangular portion of the drive arm lies in the inlet channel and a trapezoidal portion of the drive arm lies in the drive channel, a spaced-apart aggressive cam wall and a non-aggressive cam wall define the trapezoidal portion, the aggressive cam wall of the drive arm lies in substantially parallel mating relation with the aggressive cam follower wall and the non-aggressive cam wall of the drive arm lies in substantially parallel mating relation with the non-aggressive cam follower wall.

29. The method of claim 28, wherein the rotor is rotated in a first direction so that the aggressive cam wall of the drive arm engages the aggressive cam follower wall.

30. The method of claim 28, wherein the drive arm is rotated in an opposite second direction so that the non-aggressive cam wall of the drive arm engages the non-aggressive cam follower wall.

31. The method of claim 26, wherein the drive arm is assembled in the second drive arm-receiving pocket, the second drive arm-receiving pocket is formed to include a drive channel extending radially outward from the rotor axis of rotation a predetermined distance to a distal end and a receiving channel extending from the distal end of the drive channel in a direction perpendicular to the drive channel, the drive channel is defined by spaced-apart driven walls.

32. The method of claim 31, wherein the drive arm is arranged in the second drive arm-receiving pocket so that spaced-apart drive walls of the drive arm are in substantially parallel mating relation with the driven walls of the second drive arm-receiving pocket.

33. The method of claim 32, wherein the rotor is rotated in one of a first direction and an opposite second direction so that the drive wall engages the driven wall.

34. A centrifugal clutch comprising
a clutch shoe formed to include a drive arm-receiving pocket having a drive channel, an open mouth defining an inlet into the drive channel, and spaced-apart aggressive and non-aggressive cam follower walls defining the drive channel, the aggressive cam follower wall facing toward the open mouth of the inlet channel and the non-aggressive cam follower wall facing away from the open mouth of the inlet channel,
a rotor having an axis of rotation and including a rotor arm extending into the drive arm-receiving pocket,
a housing having an inner wall around the clutch shoe and rotor, the housing including means for holding the clutch shoe and rotor in engaged relation so that the rotor arm drives the clutch shoe to impart centrifugal force to the clutch shoe to move the clutch shoe outwardly from the axis of rotation to engage and rotate the inner wall during rotation of the rotor at a speed greater than a minimum predetermined speed, the aggressive cam follower wall and the rotor arm cooperating to define means for camming during rotation of the rotor about its axis of rotation in a first direction so that the rotor arm engages the aggressive cam follower wall and creates a force directed radially outwardly away from the axis of rotation to increase the torque capacity of the clutch, the non-aggressive cam follower wall and the rotor arm cooperating to define means for camming during rotation of the rotor about its axis of rotation in a second direction so that the rotor arm engages the non-aggressive cam follower wall and creates a force directed radially inwardly toward the axis of rotation to decrease the torque capacity of the clutch while providing engagement of the clutch shoe with the inner wall of the housing.

* * * * *